(12) United States Patent
Egermann et al.

(10) Patent No.: US 11,186,761 B2
(45) Date of Patent: Nov. 30, 2021

(54) METHOD FOR TREATING A ROCK FORMATION AGAINST THE INFILTRATION OF SAND USING A GEOPOLYMER CEMENT GROUT

(71) Applicants: STORENGY, Bois Colombes (FR); ECOLE CENTRALE DE LILLE, Villeneuve d'Ascq (FR)

(72) Inventors: Patrick Egermann, Cahors (FR); Baptiste Marchand, Lille (FR); Catherine Davy, Gruson (FR); Frédéric Skoczylas, Camphin en Pevele (FR); Franck Agostini, Sainghin en Weppes (FR); Laurent Jeannin, St Germain de la Grange (FR); Arnaud Lange, Rueil-Malmaison (FR)

(73) Assignees: STORENGY, Bois Colombes (FR); ECOLE CENTRALE DE LILLE, Villeneuve d'Ascq (FR)

( * ) Notice: Subject to any disclaimer, the term of this patent is extended or adjusted under 35 U.S.C. 154(b) by 0 days.

(21) Appl. No.: 16/631,503

(22) PCT Filed: Jul. 17, 2018

(86) PCT No.: PCT/FR2018/051823
§ 371 (c)(1),
(2) Date: Jan. 16, 2020

(87) PCT Pub. No.: WO2019/016469
PCT Pub. Date: Jan. 24, 2019

(65) Prior Publication Data
US 2020/0140741 A1 May 7, 2020

(30) Foreign Application Priority Data
Jul. 17, 2017 (FR) ...................................... 17 56760

(51) Int. Cl.
*E21B 43/02* (2006.01)
*C09K 8/57* (2006.01)
(Continued)

(52) U.S. Cl.
CPC .............. *C09K 8/572* (2013.01); *C04B 14/04* (2013.01); *C04B 28/006* (2013.01); *E21B 43/025* (2013.01); *C04B 2111/00732* (2013.01)

(58) Field of Classification Search
CPC ........ E21B 43/025; E21B 43/02; E21B 33/00; E21B 33/13; C04B 14/04; C04B 14/041;
(Continued)

(56) References Cited

U.S. PATENT DOCUMENTS

2013/0175037 A1 7/2013 Crews
2013/0345100 A1* 12/2013 Geary ..................... C04B 33/04
507/207

(Continued)

FOREIGN PATENT DOCUMENTS

CA 2852199 A1 10/2015
EP 2551443 A2 1/2013

OTHER PUBLICATIONS

Translation of EP 2551443 A2, retrieved Feb. 27, 2021 from EPO (Year: 2011).*
English language abstract of EP2551443.
Professor Joseph Davidovits Geopolymer Cement a review Jan. 31, 2013, XP055446526 URL:https://www.geopolymer.org/fichiers_pdf/GPCement2013.pdf.
(Continued)

*Primary Examiner* — Angela M DiTrani Leff
(74) *Attorney, Agent, or Firm* — Workman Nydegger

(57) ABSTRACT

Treatment method for a rock formation against sand infiltration during production of fluid from this rock formation via a well drilled through said rock formation, comprising at least one step of injecting a geopolymer cement grout into said rock formation, in particular around the edges of said well and/or through said well.

13 Claims, 9 Drawing Sheets

(51) Int. Cl.
*C04B 14/04* (2006.01)
*C04B 28/00* (2006.01)
*C04B 111/00* (2006.01)

(58) Field of Classification Search
CPC ... C04B 14/043; C04B 14/045; C04B 28/006; C04B 2111/00732; C04B 2111/00741; C09K 8/572; C09K 8/57; C09K 8/56; C09K 8/575; C09K 8/5751; C09K 8/5753; C09K 8/5755; C09K 8/5756; C09K 8/5758
See application file for complete search history.

(56) References Cited

U.S. PATENT DOCUMENTS

| | | | |
|---|---|---|---|
| 2014/0048264 A1 | 2/2014 | Chatterji | |
| 2019/0264095 A1* | 8/2019 | Qu | C09K 8/703 |
| 2019/0309610 A1* | 10/2019 | Nguyen | C09K 8/68 |
| 2020/0048530 A1* | 2/2020 | Nguyen | C09K 8/572 |
| 2020/0056083 A1* | 2/2020 | Khamatnurova | C09K 8/601 |

OTHER PUBLICATIONS

Matthew Miller et al The Development of Geopolymer-Based Pill as an Engineered Solution to Lost Circulation SPE Annual Technical Conference and Exhibition Jan. 1, 2013, XP055446652 DOI: 10.2118/166123-MS.

M Khalifeh Cap rock restoration in plug abandonment operations Sep. 8, 2015, XP055446723 URL:https://www.onepetro.org/download/conference-paper/SPE-175457-MS?id=conference-paper/SPE-175457-MS.

Cozic et al., Novel Insights into Microgels Systems for Water Control, 31st Annual Workshop and Symposium, Oct. 18-20, 2010, pp. 1-29.

Pittman, "Estimating Pore Throat Size in Sandstones from Routine Core-Analysis Data", Search and Discovery Article #40009, 2001, 14 pages.

Pittman, "Relationship of Porosity and Permeability to Various Parameters Derived from Mercury Injection-Capillary Pressure Curves for Sandstone", The American Association of Petroleum Geologists Bulletin, vol. 76, No. 2, Feb. 1992, pp. 191-198.

* cited by examiner

| Geopolymer cement grout | Mass percentage (i.e., mass of the component relative to the total mass of the grout) | | | | | | Number of moles | | | |
|---|---|---|---|---|---|---|---|---|---|---|
| | Metakaolin (%)/ref | | Sodium silicate (%) (including 64% by mass of water) | Sodium hydroxide (%) | Added water (%) | Total water (added water + water from the sodium silicate solution) | Al₂O₃ | SiO₂ | Na₂O | H₂O |
| | (%).ref | Grinding time | | | | | | | | |
| EX1 | 0,1 / MK1200S | 3h-8h | 36,72 | 10,14 | 53,04 | 78,77 | 1,00 | 482,59 | 500,04 | 12499,91 |
| EX2 | 0,5 / MK1200S | 3h-8h | 36,57 | 10,10 | 52,83 | 78,45 | 1,00 | 96,75 | 98,05 | 2450,96 |
| EX3 | 2,98 / MK1200S | 3h-8h | 35,66 | 9,85 | 51,51 | 76,49 | 1,00 | 18,07 | 16,08 | 401,93 |
| EX4 | 5,00 / MS1200S | 3h-8h | 34,92 | 9,54 | 50,44 | 74,91 | 1,00 | 11,70 | 9,43 | 235,85 |
| EX5 | 7,00 / MK1200S | 3h-8h | 34,19 | 9,44 | 49,38 | 73,33 | 1,00 | 8,97 | 6,60 | 164,91 |
| EX6 | 12 / MK1200S | 3h-8h | 32,35 | 8,93 | 46,72 | 69,39 | 1,00 | 6,14 | 3,64 | 91,04 |
| EX7 | 15 / MK1200S | 3h-8h | 31,25 | 8,63 | 45,13 | 67,02 | 1,00 | 5,34 | 2,81 | 70,34 |
| EX8 | 20 / MK1200S | 3h-8h | 29,41 | 8,12 | 42,47 | 63,08 | 1,00 | 4,55 | 1,99 | 49,64 |
| EX9 | 25 / MK 1200S | 3h-8h | 27,57 | 7,61 | 39,82 | 59,14 | 1,00 | 4,07 | 1,49 | 37,24 |
| EX10 | 30 / MK 1200S | 3h-8h | 25,73 | 7,10 | 37,17 | 55,20 | 1,00 | 3,75 | 1,16 | 28,96 |
| EXC11 | 12 / MK 1000 | No grinding | 32,35 | 8,93 | 46,72 | 69,39 | 1,00 | 6,14 | 3,64 | 91,04 |
| EXC12 | 20 / MK 1000 | No grinding | 29,41 | 8,12 | 42,47 | 63,08 | 1,00 | 4,55 | 1,99 | 49,64 |
| EXC13 | 12 / MK 1200S | No grinding | 32,35 | 8,93 | 46,72 | 69,39 | 1,00 | 6,14 | 3,64 | 91,04 |
| EX2A | 1,02 / MK 1200S | 3h-8h | 37,02 | 10,22 | 53,47 | 78,06 | 1,00 | 49,60 | 49,02 | 1225 |

FIG.8

METHOD FOR TREATING A ROCK FORMATION AGAINST THE INFLITRATION OF SAND USING A GEOPOLYMER CEMENT GROUT

FIELD OF THE INVENTION

The present invention concerns the field of utilization of natural or artificial fluid deposits for storing a fluid, especially gas, in rock formations, in particular underground.

BACKGROUND OF THE INVENTION

Infiltrations of sand are sometimes observed during the production of natural gas from gas reservoirs (utilization of natural gas deposits or natural gas storage activities, the context of deep aquifers or converted depleted deposits).

The rock making up the geological gas storage reservoirs is most often of sandstone composition, sometimes carbonated. This type of rock has a high porosity, of between 20% and 30%.

In the case of aquifers, during the storage period, the gas takes the place of a part of the water which it expels to the periphery of the reservoir. Conversely, during destocking, the gas is continuously withdrawn and the water replaces it, the reservoir pressure then falling sharply creating conditions conducive to driving solid particles in the gas flow. This is called infiltration of solids. When wells produce a large amount of large abrasive solid particles, the infiltration of solids is commonly called "sand infiltration".

The production of sand particles in gas flows has detrimental consequences for the operator. These inopportune rises are mainly related to the geological nature of the rock (for example sandstone) and their mechanical properties around the wells as well as to the operating conditions, which change the pressure distribution and therefore the distribution of mechanical stresses. Indeed, the production of sand particles leads to increasing the speeds along the well by the combined effect of depressurization and the overall rise of the water level which gradually limits the pass section.

A common difficulty of gas well productivity therefore arises from the weakening of the mass in which the wells are located, marked by a reduction of gas flow due to the production of solid particles on the surface (sand infiltrations). This drawback is particularly critical in the context of operating gas storage deposits, for which the sand produced in the wells, subject to high gas flow rates, has a substantial capacity to abrade surface facilities. Sand production is therefore doubly disadvantageous because it is reflected by reduced production and increased maintenance costs.

For gas field production activities, sand infiltration can occur during operation proportionally to the decrease in deposit pressure. Operational constraints related to sand infiltration are then similar to those related to natural gas storage activities.

It is therefore important to have methods available to limit or even stop this sand infiltration.

Many solutions exist to alleviate these difficulties. Thus, techniques are known for trapping solid particles on the surface before the treatment phase, for example by means of a cyclone separator, or even by setting up mechanical control (for example using a strainer with or without gravel pack) at the bottom of wells dimensioned in accordance with the formation characteristics (i.e., in particular, particle size). Chemically consolidating underground formations by using mineral binders (for example based on aluminum oxide or metallic nickel or silica in aqueous solution) or organic binder (for example, based on phenol resin, furfural resin or epoxy resin, or polyacrylamide or microgels) is also proposed.

Among these various approaches, chemical consolidation is interesting since it does not involve heavy equipment. In fact, the treatment is implemented by bullheading (i.e., surface injection and natural placement depending on the respective permeability of the reservoir layers).

In practice, chemical consolidation is done when the reservoir pressure is somewhat low (i.e., at the end of the extraction period for the storage context and during depletion in the exploration or production phase). The initial fluid treatment is first injected into the formation then partially flushed in the fluid state (before drawing off) by gas injection.

This last phase is important because it allows quickly reconnecting the wells to the gas bubble, avoiding lost productivity while applying the treatment product in the residual form in the reservoir. This treatment may be done several times in a row. The treatment must be controlled to avoid plugging the wells by too much fluid production remaining in place (for example, by withdrawing too quickly, or a treatment product viscosity that is too high or an insufficient flushing pressure, etc.). Such a technique is notably described in EP 2,551,443 A2.

Studies have shown that these polymer treatments have a preventative effect on sand infiltration by limiting the erosion of the clay cement between the particles. This effect arises from the adsorption of polymers on the inner surface of the porous medium. The adsorbed layer is thin (the size of a polymer molecule) compared to the pore size of the underground formation. This adsorbed layer allows limiting interactions between the clay and water brought into contact with these clays (in particular, condensation water that is formed during well production, which can soak the formation again).

The current limitations of polymer treatments reside in their efficacy, their limited resistance over time with, notably, a significant loss of efficacy after four years of implementation, and in their limited temperature and pressure behavior. Moreover, these treatments are sensitive to the salinity of underground water (in particular brine).

Given the usual temperature and salinity ranges of underground formations containing gas, these limitations may pose a problem for the durability of chemical treatments, whether for reducing sand infiltration or reducing water infiltration.

Therefore, there is a need for a treatment method, and a treatment product, for a rock formation, against sand infiltration, and possibly water infiltration, saline or otherwise, that allows consolidating said formation:
 in a lasting manner, while being resistant to the salinity of underground water, and
 having good mechanical performance without altering the permeability of said formation or at least having the permeability that remains satisfactory so that the well is usable again, with an adequate temperature and pressure behavior since the treatment applied will have to work at a depth of several tens of meters.

SUBJECT AND SUMMARY OF THE INVENTION

According to a first aspect, the present invention relates to a treatment method for a rock formation, in particular underground, against sand infiltration during production of fluid from this rock formation via a well drilled through said rock formation, advantageously comprising at least one step of injecting a geopolymer cement grout into said rock formation, in particular around the edges of said well and/or through said well.

In a completely astonishing manner, the inventors used a geopolymer cement grout to consolidate the rock formation without altering its permeability properties so that gas production is possible again following consolidation.

In the state of the art, geopolymer cements are used for the production of mortar or concrete. Geopolymer cement grouts are used in various applications, for example for the filling of joints and cracks or for coatings (paints).

There are two types of cements in the state of the art, so-called hydraulic cements such as Portland cement and so-called geopolymer cements. Geopolymer cements are based on mineral geopolymer formed by the polymerization of aluminosilicate oxide in the presence of an alkaline activator, such as an alkaline polysilicate. The geopolymer thus obtained has a three-dimensional structure containing the Si—O—Al bond.

The production of geopolymer cement is significantly more environmentally-friendly than the production of hydraulic cement, given that the formation of one ton of hydraulic cement generates approximately one ton of $CO_2$, while one ton of geopolymer cement only generates approximately 0.1 ton $CO_2$. Moreover, the total energy consumption involved in the production of geopolymer cement only represents a third of the energy consumption necessary for the production of hydraulic cement.

In the context of the present invention, the geopolymer cement grout is used not to fill the pores of the rock formation, in which case this formation would no longer be usable, but rather to consolidate the pores by lining them with a thin coating of geopolymer cement and creating capillary bridges between the particles of the formation.

A geopolymer cement grout is by definition very fluid compared to a pasty geopolymer cement, and is therefore injectable, unlike a geopolymer cement.

By definition, the geopolymer cement grout according to the invention does not comprise sand, in particular no solid particles other than the aluminosilicate component or aluminosilicate source mixture defined below.

The treatment method according to the invention permits consolidating the rock formation while conserving a rock formation that is permeable to fluid, in particular gas, so that fluid production can be resumed after the treatment method.

In this document, "rock formation" is understood to mean any porous rock medium, i.e., comprising interconnected pores, and, optionally, unconnected (i.e., blind) pores. Preferably, the rock formation is chosen from among sandstones, in particular those which can serve as reservoirs for fluids, especially hydrocarbons, in particular for gas.

The rock formation according to the invention may be a natural fluid deposit or may have been created so as to serve as a storage deposit for a fluid (for example, storage in a salt cave, in an aquifer or in a depleted deposit).

"Fluid" is understood to mean any liquid or gas, especially hydrocarbons. Said fluid is particularly a gas, especially a natural gas.

In this document, sand infiltration means any solid particulate material, which can be sand whose particle size (diameter) is greater than or equal to 80 µm, and, in particular, less than or equal to 2 mm, or fines, whose size (diameter) is less than 80 µm.

Preferably, the porosity of the underground formation is greater than or equal to 15%. No upper porosity limit is set because it will be easier to inject the grout into a medium with larger pore sizes.

Following the treatment method, the underground formation conserves permeability equivalent to its initial permeability before treatment, or an initial permeability reduced at the most by 20% for treatment of the most permeable formations (in particular, typically with a permeability greater than or equal to 1 Darcy), or at most 10%, in particular, for a permeability less than 1 Darcy.

The rock formation may comprise several wells drilled into it. The grout injection may therefore be done around the edges and/or directly through one or more wells for one rock formation.

"Through the well" is understood to mean that the geopolymer cement grout is injected directly by means of the well fluid inlet conduit.

"At the edges of the well" is understood to mean that the geopolymer cement grout is injected in a radius of approximately 30 meters, preferably in a radius of approximately 10 meters, around the well. Preferably, in this case, shafts are arranged around the well and placed in the subsoil of the rock formation and serve as entry points for grout injection.

Before implementing the method according to the invention, fluid, i.e., gas, production is stopped.

It is possible to conduct several geopolymer cement grout injections. The grout properties may be different from one injection to another (notably mass concentration and size of the particles of the aluminosilicate component or in said aluminosilicate source mixture, mass fraction of water and composition).

In one embodiment, the volume of geopolymer cement grout injected is the standard volume determined in methods for treating rock formations against sand infiltration known to the person skilled in the art (in particular in the method known as bullheading).

Preferably, the injected grout volume corresponds to a saturation of grout in a determined radius around the well. For example, for a radius of approximately 5 meters, and a layer of 15 meters thick, of porosity 20%, the volume of grout to inject is around 60 m³.

The volume of grout to inject is preferably greater than or equal to ⅕ (i.e., 20%) of the porous volume of the rock formation to be treated, more preferably less than or equal to 10 porous volumes of the rock formation to be treated. The porous volume is the volume occupied by the pores of a given volume of the rock formation to be treated.

In one variant, in particular after at least one injection of geopolymer cement grout, the treatment method comprises at least one step of injecting a gas around the edges of said well and/or through said well to reconnect to said well the gas of the formation, and notably to expel the water contained in the geopolymer cement grout.

Preferably, the gas injected is a hydrocarbon, preferably of the same type as the gas extracted from the well.

When the formation at the edges of the well is saturated in grout, the high water saturation decreases the gas permeability.

In order to reestablish permeability to fluid, in particular to gas, a volume of gas $V_g$ is injected into the formation at the edges of the well and/or through the well (used for the injection of the grout), in order to reconnect the fluid bubble to the well. Therefore, the gas pushes the water to the edges of the wells. Once the water is expelled, the injection can be stopped.

In one embodiment, the flow rate of injected gas is high to make the fluid, notably gas, quickly break through the barrier created by the water.

In another embodiment, the gas injection flow rate in this phase of reconnecting the fluid to the rock formation is controlled. The flow rate must be sufficiently low to allow substantial saturation in residual water, and thereby permit reinforcing the degree of consolidation of the formation. Indeed, this arrangement favors the formation of capillary bridges between the particles of the rock formation and the geopolymer. It is therefore important to have a high residual water saturation in order to increase the quantity of geopolymer per bridge. The flow rate can be precisely evaluated using a flow simulation. Preferably, the residual water saturation is comprised between 10% and 15% above the irreducible water saturation.

"Residual water saturation" is understood to mean the mean quantity of water that remains in the rock formation, for example the aquifer, around the well, once the geopolymer cement grout is injected and the reconnection phase is finished.

The residual water saturation especially depends on the permeability curves relative to the porous medium into which the gas is injected, and the capillary pressure curve. In particular, depending on the flow rate of the injected gas, residual saturation can be calculated with a reservoir simulator such as the Eclipse software, a commercial simulator developed by Schlumberger.

The beginning of reconnection is typically identified by a sudden increase in the gas flow rate due to the pressure imposed by the gas from the reconnection.

The cumulative volume of gas to be injected preferably corresponds to the restitution of an injection close to the initial value.

Preferably, the volume of gas injected is greater than or equal to at least 50 porous volumes. For example, for a porous volume of 60 m$^3$ and a bottom pressure of 50 bars, the cumulative gas volume $V_g$ injected will be between approximately 3000 m$^3$ and approximately 150,000 m$^3$.

Then, after reconnection, gas injection is continued so as to dry the capillary bridges and lead to the formation of a maximum of adhesive interparticle bridges without changing the well productivity and injectivity parameters.

In a first embodiment, for this drying phase, the injected gas can be the gas injected in view of filling the deposit to be stored. This filling phase can last several months (approximately 3 to 4 months) and therefore has no limits for the volume injected.

In a second embodiment, for this drying phase, the volume of gas injected during the reconnection phase is used to partially dry the capillary bridges.

The treatment method therefore may comprise a second gas injection or the continuation of the first gas injection after reconnection, corresponding to the drying phase.

In one variant, the method comprises a step of polymerizing the geopolymer cement at the end of which a coating in the geopolymer cement at least partially covering the walls of the rock formation pores is obtained.

Preferably, following the gas injection step, the method comprises a step of polymerizing the geopolymer.

The geopolymer cement grout will harden in situ, i.e., at the site where it was injected. The complete hardening time is around at least 7 days, preferably at least 40 days.

The period extending from the end of one withdrawal period to the beginning of the next campaign is from 3 to 8 months, which therefore leaves the geopolymer time to harden perfectly under the operating conditions.

Advantageously, the hardening time of at least 40 days is obtained at ambient temperature (in particular, a temperature comprised between 10° C. and 30° C.), and notably at atmospheric pressure.

In one variant, the treatment method comprises several injection cycles, each injection cycle comprising at least one geopolymer cement grout injection step followed by at least one gas injection step.

In one variant, prior to said at least one grout injection step, the rock formation is permeable and comprises a fluid (in particular, which can be withdrawn), and after said at least one grout injection step and/or after said at least one gas injection step, especially and/or after said polymerization step, the rock formation is permeable and configured to comprise a fluid (especially one which can be withdrawn).

In one variant, the geopolymer cement grout comprises at least one aluminosilicate source component, or a mixture of several components, said mixture being a source of aluminosilicate, and an alkaline silicate solution.

The alkaline silicate activating solutions of the aluminosilicate source component, or a mixture of several components, said mixture being a source of aluminosilicate, are aqueous solutions.

The alkaline silicate solution preferably has a molar ratio $M^1_2O:SiO_2$ or $M^2O:SiO_2$ comprised within the range of from 0.50 to 1.50, preferably in the range of from 0.90 to 1.10, in which $M^1_2$ represents Na or K, and $M^2$ represents Ca.

The molar ratio indicated above is calculated by taking into account any addition of sodium hydroxide, potassium hydroxide or calcium hydroxide to the alkaline silicate solution when this solution is respectively sodium, potassium or calcium silicate.

The geopolymer cement according to the invention is obtained by mixture of constituents a) and b) according to techniques well known to the skilled person.

The alkaline silicate solution according to the invention may be a commercial solution that can be used as such.

Alkaline silicate solution is understood to mean the solution to activate the polymerization reaction between said at least one aluminosilicate source component, or a mixture of several components, said mixture being a source of aluminosilicate.

Preferably, the alkaline silicate solution generally has a mass content in water greater than or equal to 30% and less than or equal to 90%, preferably greater than or equal to 40% and less than or equal to 80%, more preferably greater than or equal to 50% and less than or equal to 70%, more preferentially greater than or equal to 55% and less than or equal to 65%.

At least one component is understood to mean one or more than two components.

Several components is understood to mean two components or more.

"An aluminosilicate component" is understood to mean any silicate comprising aluminum (Al).

"A mixture of several components, said mixture being a source of aluminosilicate" is understood to mean any mixture providing silica and aluminum oxide.

In one embodiment, at least 50% by cumulative volume of particles of said at least one aluminosilicate component or of said mixture of several components, said mixture being a source of aluminosilicate, have a particle size less than or equal to one-sixth (⅙), preferably one-seventh (1/7), more preferably one-eighth (⅛), more preferentially one-ninth (1/9), in particular one-tenth (1/10), the size of at least 50% by cumulative volume of the pores of the rock formation, or of the mean hydraulic diameter of the pores of the rock formation.

In particular, the $d_{50}$ of the particles of said at least one aluminosilicate component, or a mixture of several components, said mixture being a source of aluminosilicate, is ≤⅙, preferably ≤⅐, more preferably ≤⅛, of the pores of the rock formation, or the mean hydraulic diameter of the pores of the rock formation.

In this document, $d_x$ (x being a real number) of pores or of particles is understood to mean that the distribution of these pores or these particles comprises at least x % by cumulative volume of pores or particles having a diameter less than or equal to a given value.

The size (in particular the diameter) of the particles is preferably determined by a laser granulometry method, such as described below.

In one embodiment, the porosity of the rock formation to be treated is assessed prior to the preparation of the particles of said at least one aluminosilicate component, or a mixture of several components, said mixture being a source of aluminosilicate.

When it is possible to obtain a sample of the rock formation to be consolidated, the porosity is assessed by a mercury injection porosimetry method (for example using standard ISO 15901—part 1: April 2016 or else as described below) or else by microtomography (such as described below).

When the porosity is assessed by microtomography and several curves are obtained (xy low, xy high, xz low, xz high, yz low and yz high), the $d_{50}$ taken into account in the context of this document is the smallest diameter size obtained at 50% of cumulative volume.

When it is not possible to obtain a sample of the rock formation to be consolidated, the porosity of the underground formation can be assessed from well operating data by applying the following Pittman formula, established empirically:

$$d_h = 2 \times 10^{(-0.117 + 0.475 \, Log(k) - 0.099 \, Log(\phi))}$$

wherein $d_h$ is the mean hydraulic diameter of the pores (μm), K is the permeability of the porous medium in mDarcy, and $\Phi$ is the porosity of the porous medium in percentage.

Establishing the Pittman formula is explained in the publication entitled "Estimating Pore Throat Size in Sandstones from Routine Core-Analysis Data", Edward D. Pittman, Search and Discovery Article #40009 (2001) or else in the publication "Relationship of Porosity and Permeability to Various Parameters Derived from Mercury Injection-Capillary Pressure Curves for Sandstone", Edward D. Pittman in MPG Bulletin, V. 76, 1992, p. 191-198, the contents of said publications being incorporated by reference into this document).

Moreover, the inventors realized by their tests that the ratio of the particle size of injected grout compared to the pore size of the underground formation: ($d_{50}$ in cumulative volume or $d_h$ of the pores of the formation)/($d_{50}$ in volume of the injected grout particles) is equivalent to the jamming ratio.

The jamming ratio is described in the publication entitled "Novel Insights into Microgel Systems for Water Control" by the authors C. Cozic, D. Rousseau, and R. Tabary during the 31st Annual Workshop and Symposium, IEA Collaborative Project on Enhanced Oil Recovery, 18-20 October, Aberdeen, Scotland. The jamming ratio represents the ratio between the mean diameter of the substrate pores receiving said particles in solution and the mean diameter of the injected particles. The functional jamming ratio is assessed in this publication in regard to the particles of a microgel. In theory, in this publication, the jamming ratio is around 3, but in practice it is higher due to the particle size distribution, the geometry distribution and the size of the pores, as well as the concentration and effects of velocity. The practical jamming ratio would therefore be around 6-9.

In one variant, the size of at least 50% by cumulative volume of the particles of the aluminosilicate component or of the source mixture of aluminosilicate is less than or equal to 5 μm, preferably less than or equal to 3.75 μm, more preferably less than or equal to 1.6 μm, more preferentially less than or equal to 1.25 μm, especially less than or equal to 1 μm.

In one embodiment, for rock formations to be consolidated whose permeability is comprised between 300 mDarcy and 500 mDarcy, with a mean porosity of 25% (+/−5%), the mean hydraulic diameters are comprised between 10 μm and 30 μm.

In one variant, the treatment method comprises a preparation step of the particles of said at least one aluminosilicate component, or a mixture of several components, said mixture being a source of aluminosilicate, so that at least 50% of the cumulative volume of said particles have a particle size less than or equal to one-sixth (⅙), preferably one-seventh (⅐), more preferably one-eighth (⅛), more preferentially one-ninth (⅑), in particular one-tenth (1/10), the size of at least 50% by cumulative volume of the pores of the rock formation, or the mean hydraulic diameter $d_h$ of the pores of the rock formation.

Said preparation step may include a centrifugation step so as to select the small size particles from a set of centrifuged particles, or else a step of dissolving the particles to reduce their size, or preferably a step of grinding in a dry or wet environment, in particular a step of grinding in a wet environment.

The grinding step, in particular in a wet environment, unlike the centrifugation step, for example, preserves the initial aluminosilicate composition.

In one variant, the method comprises a step of reducing the particle size of said at least one aluminosilicate component, or a mixture of several components, said mixture being a source of aluminosilicate.

In one variant, the reduction or preparation step is a grinding step, preferably a grinding step in wet environment.

In one variant, the geopolymer cement grout comprises a mass portion of water, relative to its total mass, greater than or equal to 50%, preferably greater than or equal to 60%, more preferably greater than or equal to 65%, especially greater than or equal to 70%, more preferentially less than or equal to 85%.

Advantageously, the geopolymer cement grout according to the invention comprises more water than the geopolymer grouts or cements used in the prior art, which reduces its viscosity, and improves its injectability in the present application.

The mass of water corresponds to the one present initially in the basic activator solution, notably available commercially, and to the mass of added water.

Advantageously, the large amount of water makes it possible to delay in-situ polymerization of the geopolymer, and therefore allows controlling its hardening so as to avoid plugging the pores of the rock formation. This arrangement contributes to maintaining good permeability of the rock formation after its treatment.

In one variant of embodiment, said at least one aluminosilicate component, or a mixture of several components, said mixture being a source of aluminosilicate, is chosen from among: a metakaolin, a kaolin, a bentonite, fly ash, blast furnace slag, silica smoke, and mixtures thereof.

In one embodiment, the aluminosilicate component is a metakaolin.

The aluminosilicate component, when it is a metakaolin, may be mixed with at least one component chosen from: a kaolin, a bentonite, fly ash, a blast furnace slag, silica smoke, and mixtures thereof; preferably kaolin, bentonite, fly ash, blast furnace slag, and mixtures thereof.

The metakaolin (or calcined kaolin) used in the context of the present invention is preferably a dehydroxylated aluminosilicate of general composition $Al_2O_3$: 2.19-2.64. $SiO_2$. It is an artificial pozzolan in an amorphous state. It is obtained by calcination and grinding, in particular by micronization of a kaolin clay.

The kaolin (non-calcined) is preferably a clay of the alumina silicate family that is ground and dried. The kaolin has a BET specific surface less than or equal to 30 $m^2/g$, in particular less than or equal to 25 $m^2/g$.

The bentonite used in the context of the present invention is a clay of the smectite family having a large swelling capacity with water.

The blast furnace slag used in the context of the present invention is preferably a co-product of the manufacture of cast iron and steel, resulting from a high temperature treatment of coke and agglomerated iron ore.

The fly ash used in the context of the present invention may be class F fly ash, from the combustion of pulverized coal in a flame thermal power station at a temperature of approximately 1,400° C.

The particle size values discussed above naturally apply not only to the metakaolin, but to the mixture of solid particles implemented in the grout according to the invention.

In one variant, the alkaline silicate solution is an alkaline potassium, sodium or calcium silicate solution, preferably an alkaline potassium or sodium solution, more preferably sodium.

In one variant, the mass of said at least one aluminosilicate component, or mixture of several components, said mixture being a source of aluminosilicate, relative to the total mass of the geopolymer cement grout (including the total mass of water) is greater than 0% and less than or equal to 30%, preferably less than or equal to 25%, more preferably less than or equal to 20%, more preferentially less than or equal to 18%, in particular less than or equal to 15%.

The mass of said at least one aluminosilicate component, or mixture of several components, said mixture being a source of aluminosilicate, relative to the total mass of the geopolymer cement grout (including the total mass of water) is greater than or equal to 3%, more particularly greater than or equal to 5%, notably greater than or equal to 7%.

In one embodiment, the mass of said at least one aluminosilicate component, or a mixture of several components, said mixture being a source of aluminosilicate, relative to the dry mass of the geopolymer cement grout is greater than or equal to 10%, and less than or equal to 75%.

In one embodiment, the mass fraction of said at least one aluminosilicate component, or mixture of several components, said mixture being a source of aluminosilicate, more preferably metakaolin, relative to the total dry mass of the geopolymer cement grout is less than or equal to 70%, preferably 60%, preferentially 50%, especially 25%.

In one embodiment, the mass fraction of sodium, potassium or calcium silicate, preferably sodium (without water), relative to the total dry mass of the geopolymer cement grout is greater than or equal to 30%, preferably 40%, preferentially 50%, especially 75%.

The total dry mass may be assessed by drying the cement in a vacuum oven, for example approximately 100 g of grout, until the dry mass obtained is stable (for example to within +/−2%).

In one variant, the total dry mass of the geopolymer cement grout comprises less than 35% by mass, more preferably less than 25% by mass, preferentially less than 10% by mass, in particular less than 5% by mass, of calcium.

In one variant, the aluminosilicate component, or mixture of several components, said mixture being a source of aluminosilicate, comprises less than 35% by mass, more preferably less than 25% by mass, preferentially less than 10% by mass, in particular less than 5% by mass, of calcium relative to the mass of the aluminosilicate component or the mass of said mixture of several components that is the aluminosilicate source.

In one variant, the aluminosilicate component, or mixture of several components, said mixture being a source of aluminosilicate, comprises a mass fraction of $SiO_2$ greater than or equal to 40%, preferably greater than or equal to 50%, in particular less than or equal to 70%, more particularly less than or equal to 60%.

In one variant, the aluminosilicate component, or a mixture of several components, said mixture being a source of aluminosilicate, comprises a mass fraction of $Al_2O_3$ greater than or equal to 20%, preferably greater than or equal to 30%, in particular less than or equal to 50%, more particularly less than or equal to 40%.

The mass fraction of $Al_2O_3$ or of $SiO_2$ can be determined by X-ray fluorescence spectrometry.

In one variant, the geopolymer cement grout has a viscosity, measured at ambient temperature, less than or equal to 25 mPa·s, preferably less than or equal to 10 mPa·s.

In one variant, the chemical composition resulting from the mixture of a) at least one aluminosilicate component, or the mixture of several components, said mixture being a source of aluminosilicate, with the alkaline silicate solution b), and, optionally, added water, has the formula: $Al_2O_3$; $nSiO_2$; $r(M^1{}_2O$ or $M^2O)$; $zH_2O$, wherein $2 \leq n \leq 500$, in particular $2 \leq n \leq 20$, and $z \geq 25$, $1 \leq r \leq 500$, in particular $1 \leq r \leq 16$, and $M^1$ is Na or K and $M^2$ is Ca, preferably $z \geq 45$, more preferably $3.6 \leq n \leq 500$, in particular $3.6 \leq n \leq 20$, and/or $z \geq 70$, more preferentially $z \geq 88$, still more preferentially $4.5 \leq n \leq 500$, especially $4.5 \leq n \leq 20$, in particular $z \leq 400$.

The present invention relates, according to a second aspect, to a geopolymer cement grout comprising:

a) at least one aluminosilicate component, or a mixture of several components, said mixture being a source of aluminosilicate, and b) an alkaline silicate solution.

Advantageously, the geopolymer cement grout comprises a mass fraction of water, relative to its total mass, greater than or equal to 50%, preferably greater than or equal to 60%, more preferably greater than or equal to 65%, more preferentially less than or equal to 85%.

In one variant, the geopolymer cement grout is defined according to any one of the definitions, variants, or embodiments defined in reference to the first aspect of the invention.

The present invention relates, according to a third aspect, to a treatment method for a rock formation, in particular underground, against sand infiltration during the production of a fluid from this rock formation via a well drilled through said rock formation. Advantageously, the method comprises at least one step of injecting a geopolymer cement grout into said rock formation, in particular around the edges of said well and/or through said well, the grout being defined according to any one of the definitions, variants or embodiments defined in reference to the first and/or second aspects of the invention.

The present invention relates, according to a fourth aspect, to a rock formation consolidated by a geopolymer cement grout, able to be obtained by the method according to any one of the variants of embodiment defined in regard to the first and/or the third aspect(s) of the invention.

The definitions, variants and embodiments defined according to the first, second, third and fourth aspects of the invention can be combined independently of one another.

DESCRIPTION OF THE FIGURES

FIG. 8 shows a table summarizing the compositions of Examples 1 to 10 and Comparative Examples 11 to 13;

DESCRIPTION OF EXAMPLES OF EMBODIMENT

I—The Following Components are Used

Metakaolin:
ARGICAL™ brand powdered MK 1000 sold by IMERYS, comprising 57% of $SiO_2$, and 37% of $Al_2O_3$, having a $d_{90}$ of 40 μm, a $d_{50}$ of 11.55 μm and a $d_{10}$ of 2.44 μm, these values being measured by laser granulometry such as described below.
ARGICAL brand powdered MK 1200S sold by IMERYS, comprising 56% of $SiO_2$, and 36% of $Al_2O_3$, having a $d_{90}$ of 16.61 μm, a $d_{50}$ of 5.02 μm and a $d_{10}$ of 1.64 μm, these values being measured by laser granulometry such as described below.
Complete siliceous sand model: Leucate standard (EN 196-1 standard, ISO 679:2009 compliant), known density of 2.6 $g/cm^3$.
Sodium silicate: BETOL 39® T sold by Woellner.

II—Treatment Method for a Rock Formation According to the Invention

Steps 2 and 3 according to the invention can be done, respectively, n times and p times, n and p being integer numbers, greater than or equal to 1.

In the context of the tests conducted below, n and p are equal to 1.

Step 4 may take place at ambient temperature and pressure; the polymerization time is in this case at least 7 days, preferably at least 25 days, more preferably at least 40 days.

The polymerization time may also be shortened if the geopolymer is heated, preferably to a temperature less than or equal to 70° C.

In practice, the polymerization temperature and pressure applied during polymerization will depend on the depth at which the geopolymer injected into the rock formation is found. Since the period between the end of one extraction campaign and the resumption of the next campaign is at least 2 months and generally more than 7 months, the geopolymer has the time to polymerize in situ in the rock formation.

Figure 1:
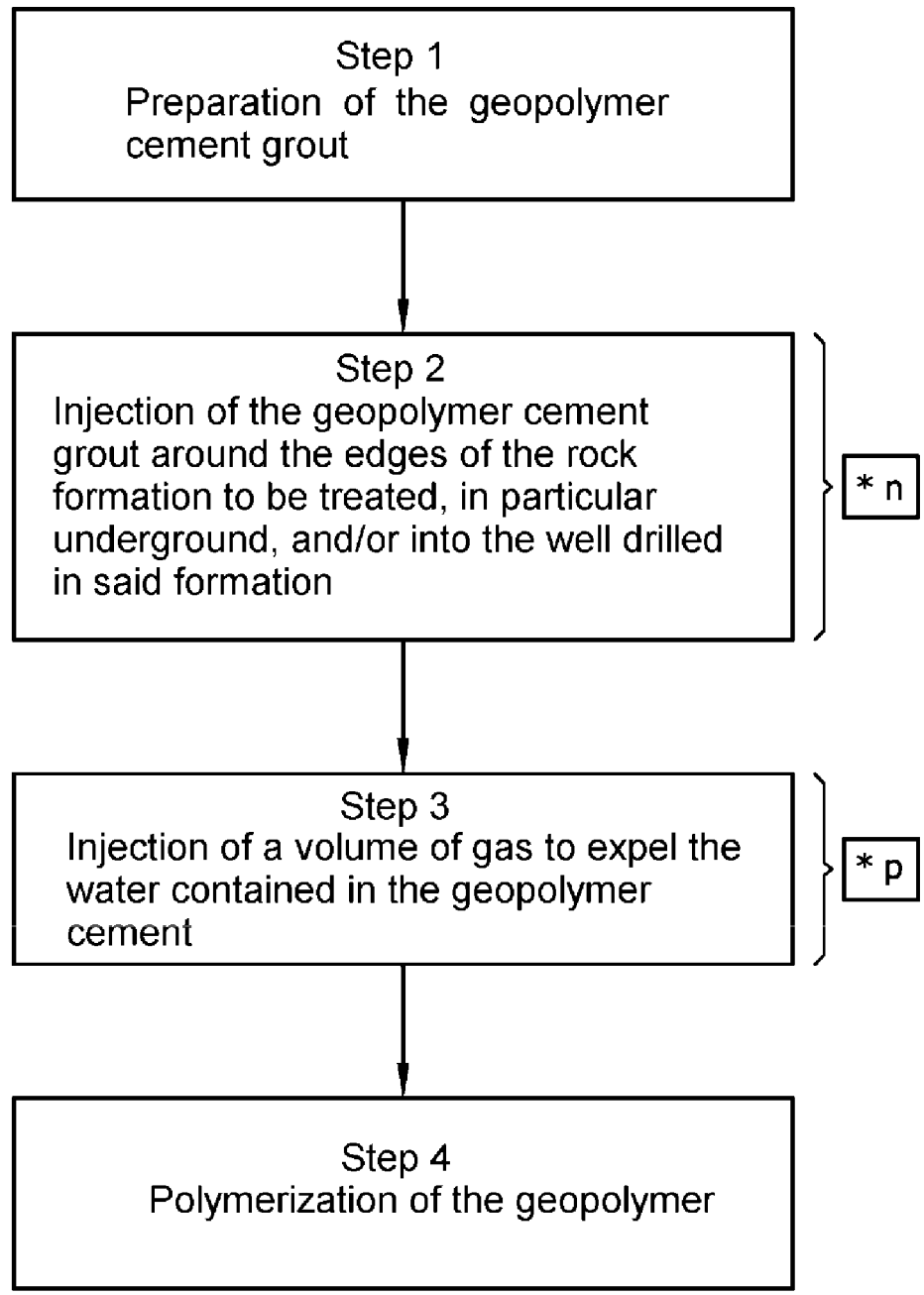
FIG. 1 schematically shows the different steps of the treatment method for a rock formation according to the invention in view of its consolidation to treat sand infiltrations.
Figure 2:
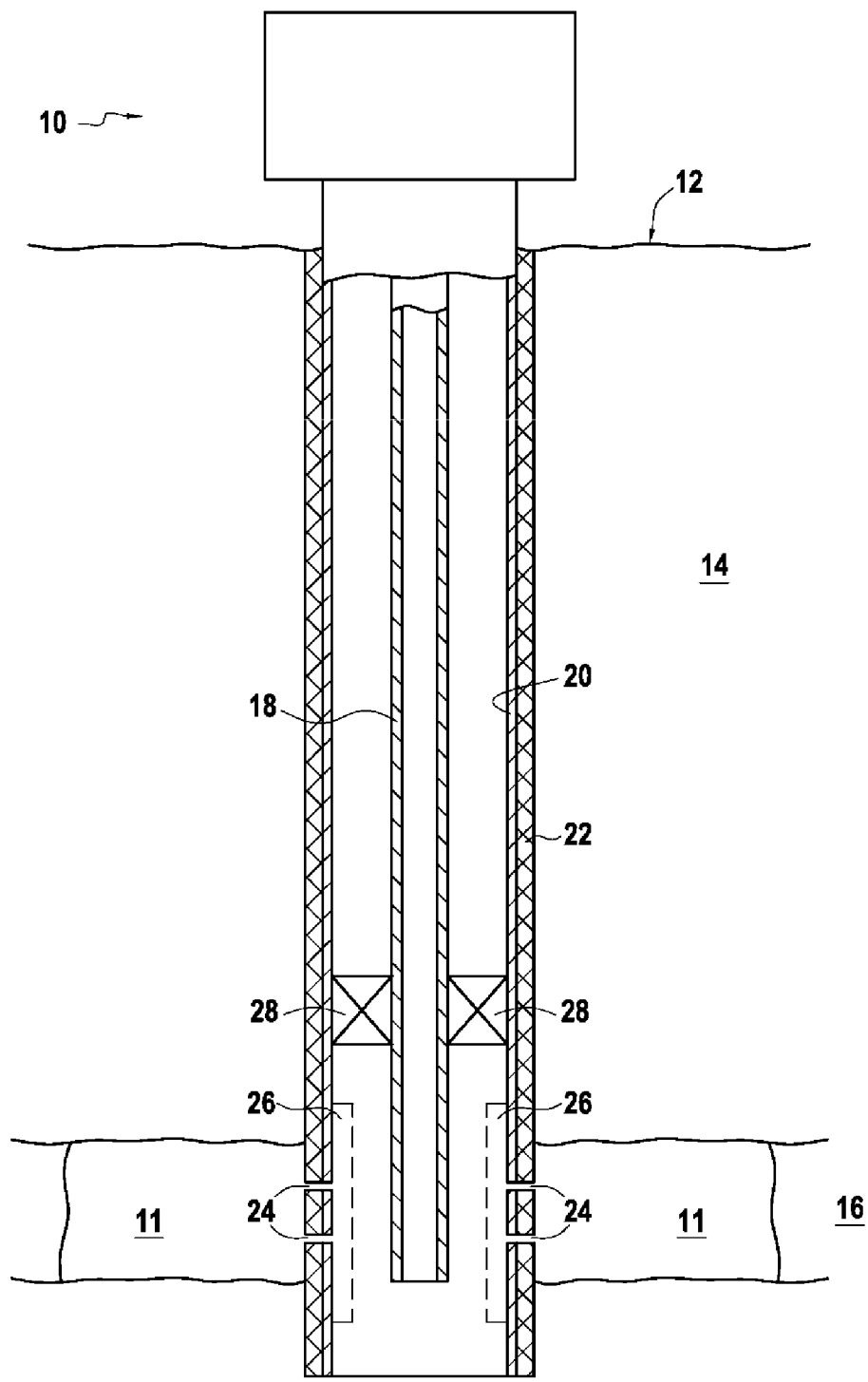
FIG. 2 schematically shows a well drilled through an underground rock formation.

Well 10 shown in FIG. 2, in cross section, extends from surface 12 through soil 14 down to underground rock formation 16 comprising fluid 11, especially gas, to be extracted. Rock formation 16 is not consolidated, and particles, fine and/or more or less coarse are produced in well 10 when fluid 11 is extracted through well 10. Well 10 comprises an extraction conduit 18 for fluid 11, extending from surface 12 down to near, in or under rock formation 16. Well 10 also has a tubular casing 20, surrounded by a material 22 consolidating it, for example a layer of cement, said casing 20 being arranged around withdrawal conduit 18 but at a distance from this conduit 18. Casing 20 and material 22 consolidating it comprise, in their lower parts, orifices 24 opening into rock formation 16 comprising fluid 11, in this specific example, gas. Gravel packs 26 may be arranged between casing 20 and extraction conduit 18, in their lower parts, in order to limit sand infiltration. Well 10 also comprises a packer device 28, for securing the lower part of conduit 18 to well 10 and especially to casing 20. This device 28 is, for example, a rubber ring encased in the annular space between conduit 18 and casing 20, to ensure a seal and anchor conduit 18.

In operation, a volume of geopolymer cement grout according to the invention (determined according to the volume of the pores to be treated in the formation) is injected around the edges of said wells 10, for example in a radius of approximately 10 meters from the well and/or through extraction conduit 18. The grout will then fill the pores of the rock formation and therefore push fluid 11 to be extracted out of this formation. Then, a given volume of gas (also depending on the volume of pores to be treated in the formation) is injected, in the same way as the grout, so as to reconnect the fluid to the underground formation, and then expel the water contained in the grout injected into the rock formation. This operation may be repeated to promote the inter-particle adherence of the geopolymer and dry the capillary bridges formed between the particles of the formation and the geopolymer. Once the reconnection phase is established, it is possible to conduct the drying phase by filling underground formation 16 with storage fluid 11.

The method according to the invention is described in reference to a particular arrangement of wells, but is not limited to this arrangement and may be applied to all wells drilled in a rock formation to be consolidated.

III—Characterization of a Test Medium

1—Sandstone Samples A to D

Mercury injection porosimetry is conducted according to standard ISO 15901-1:2016, with Micromeritics AutoPore IV 9500 V1.03 of 0/200 MPa.

This measurement method was implemented, in particular, with the following parameters: contact angle of 130 degrees, mercury density of 13.5335 g/l, surface tension of 485 dynes/cm, equilibration time 20 sec, evacuation time 5 minutes, white correction, 15 cc-0.68 cc solid cell and associated manufacturer software.

Figure 3:
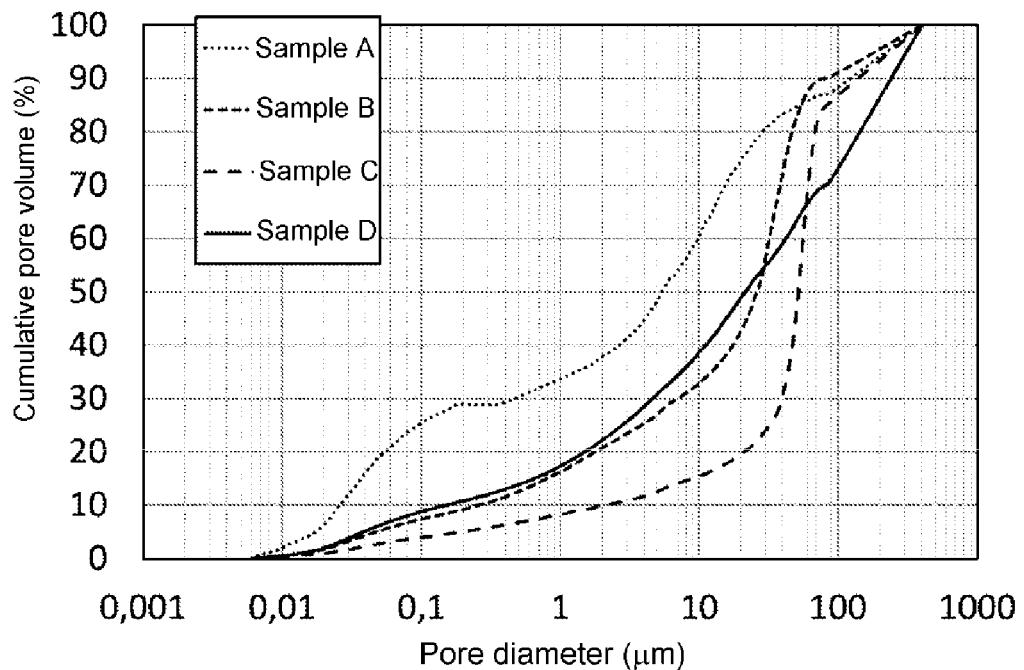
FIG. 3 shows the cumulative pore volume (%) as a function of the pore size (μm) for various natural sandstone samples tested, referenced A to D, by mercury injection porosimetry.

Table 1 below indicates the pore size of sandstone samples A to D sampled in situ in micrometers at 90%, 50% or 10% of the cumulative volume distribution of pore sizes. These data result from FIG. 3.

TABLE 1

| Sample | $d_{90}$ | $d_{50}$ | $d_{10}$ |
|---|---|---|---|
| Sample A | 152.71 μm | 5.42 μm | 0.03 μm |
| Sample B | 78.81 μm | 26.22 μm | 0.26 μm |
| Sample C | 182.83 μm | 51.99 μm | 2.09 μm |
| Sample D | 294.52 μm | 21.61 μm | 0.15 μm |

2—Sand Model

Figure 4:
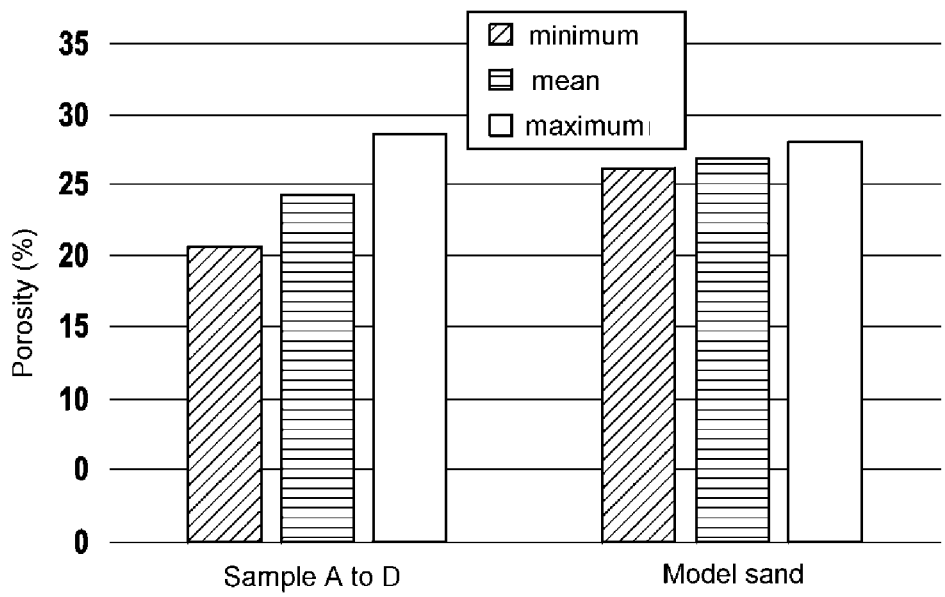
FIG. 4 shows the minimum, mean and maximum porosities measured for sandstone samples A to D and the complete sand model.

The porosities of samples A to D in FIG. 4 are determined by ethanol saturation.

The method for measuring porosity by ethanol saturation is preferably conducted by first drying the sample at 105° C. until stabilization of its mass to within +/−0.5% enabling its dry mass (mdry) to be determined, then immersing in ethanol until stabilization of its mass to within +/−0.5% enabling its saturated mass (msat) to be determined. Finally, the sample mass is determined by hydrostatic weighing (mhydro). The porosity (%) is then calculated by the relationship 100*(msat−mdry)(msat−mhydro).

The porosities of complete siliceous sand are determined by microtomography (the measurements are done on tubes filled with sand such as described in Section IV). The siliceous sand is impregnated with an epoxy resin to stabilize it. The images obtained by microtomography (source 160 kV, tungsten filament, voxel size 1.06 μm) are analyzed by Image J software.

Table 2 below shows the average, minimum and maximum porosities from FIG. 4.

TABLE 2

| | Porosity | | |
|---|---|---|---|
| Samples | Mean (%) | Minimum (%) | Maximum (%) |
| Samples A to D | 24.77% | 20.59 | 27.76 |
| Siliceous sand model | 26.3 | 24.7 | 28.2 |

Figure 5:
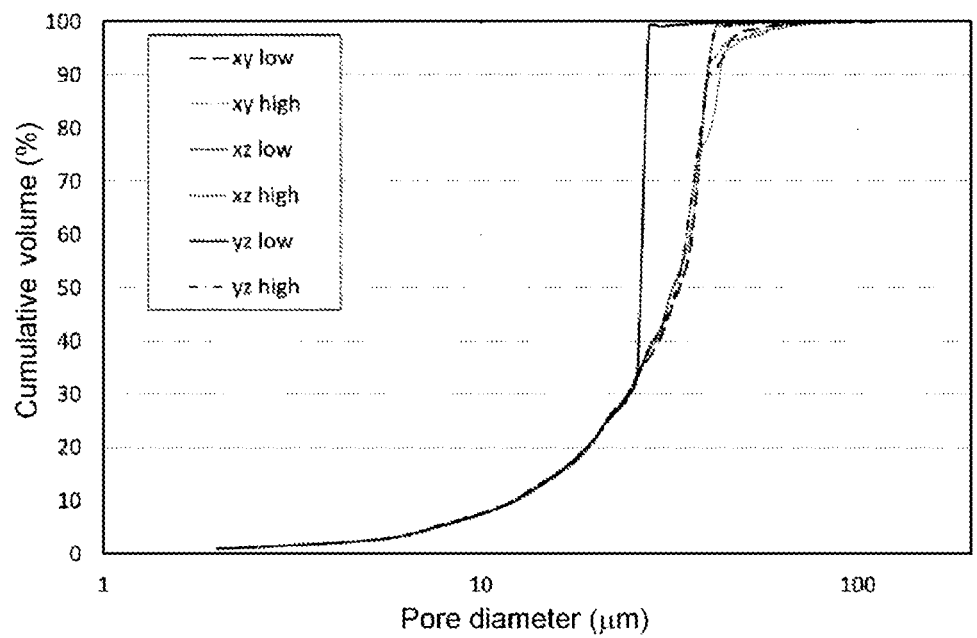
FIG. 5 shows the cumulative pore volume (%) as a function of the pore diameters (μm) for the sand model tested by microtomography, in particular, the pore size distribution is obtained by numerical simulation between two parallel faces (XY, XZ or YZ in one direction then the other) on 1000 segmented microtomography images, using Image J software (Fiji) and the Beat plugin.

The porosity of sandstone samples A to D is comprised between 20% and 30% with a mean porosity of around 24.77%. The complete sand model (i.e., comprising fines and sand) has a mean porosity of 26.3%, ranging from 25% to 30%. The porosity of the sand model is slightly greater than that of sandstone samples A to D. In contrast, according to FIG. 5, 50% by cumulative volume of model sand pores have a diameter comprised between 28 μm and 34 μm. Thus, the $d_{50}$ of the sand model is equivalent to those measured for samples A to D ($d_{50}$=21.6 μm to 52.0 μm).

In conclusion, the complete siliceous sand selected is a good model to reproduce the porous network of the underground rock formation.

IV—Preparation of a PAM (Polyacrylamide) Sample, (CEX1)

An amount of 1.101 g of a PAM powder, sold by Floerger under reference FA 920 SH, is dissolved in 198.9 g of water with gentle stirring (approximately 200 rpm), for 3 h. The stock solution obtained is then diluted by the addition of water until obtaining the tested solution at 2500 ppm (or 2.5 g of PAM per 1000 g of solution). The activity index is 90.85%.

V—Preparation of the Basic Activator Solution as Comparative Sample (CEX2, CEX3)

The basic solution thus comprises 36.76 g of sodium silicate including 64% of water by mass, 10.15 g of sodium hydroxide and 53.09 g of water added for CEX2 or 0.96 moles of $SiO_2$ and 1 mole of $Na_2O$ and 25 moles of water, serving as comparative example CEX3; the amount of water added is doubled, or 106.18 g (50 mol), the molar proportions of $SiO_2$ and $Na_2O$ are unchanged. The sodium silicate used also comprises 64% by mass of water for CEX2 and CEX3.

VI—Compressive Strength of a Standard Metakaolin-Based Mortar (MK 1000) Measured by Mixing with Demineralized Water or Brine (20 g/L)

It is not possible to measure the compressive strength of Comparative Examples CEX1 and CEX2 because the solutions are too liquid (there is too much water) to provide a resistant and non-cracking paste within the framework of standard EN 196-1 (manufacture of standardized mortar). The mortar is prepared according to a manufacturing method well known to the skilled person. Standardized sand (siliceous Leucate 0/1.25 mm according to EN 196-1 and compliant with ISO 679:2009) is mixed with the geopolymer cement based on MK 1000 (312 g), sodium silicate (244 g), sodium hydroxide (65 g) and water (106 g). The compressive strength of mortar based on metakaolin MK1000 is around 42-43 MPa at 7 days, and 49 MPa at 28 days when it is malaxed with demineralized water. This compressive strength is similar for the same mortar based on metakaolin MK 1000 when brine (20 g/l) is used to manufacture it.

The advantage of a geopolymer cement grout as treatment solution compared to polyacrylamide polymers (CEX1) or the basic sodium silicate solution (CEX2) especially resides in the formation of a coating lining the pores to be consolidated that has good water resistance properties, in particular to brine.

VII—Support, Treatment Fluid Injection and Gas Injection (Flushing)

Figure 6A:
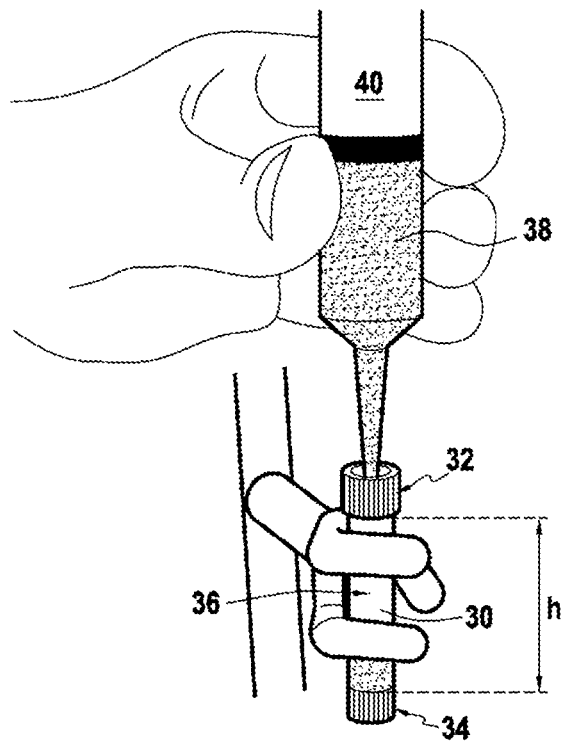
FIG. 6A schematically shows the injection by means of a syringe of the treatment solution to be tested through the channel of the upper plug of a plastic tube receiving the complete sand used as a model material to be consolidated.
Figure 6B:
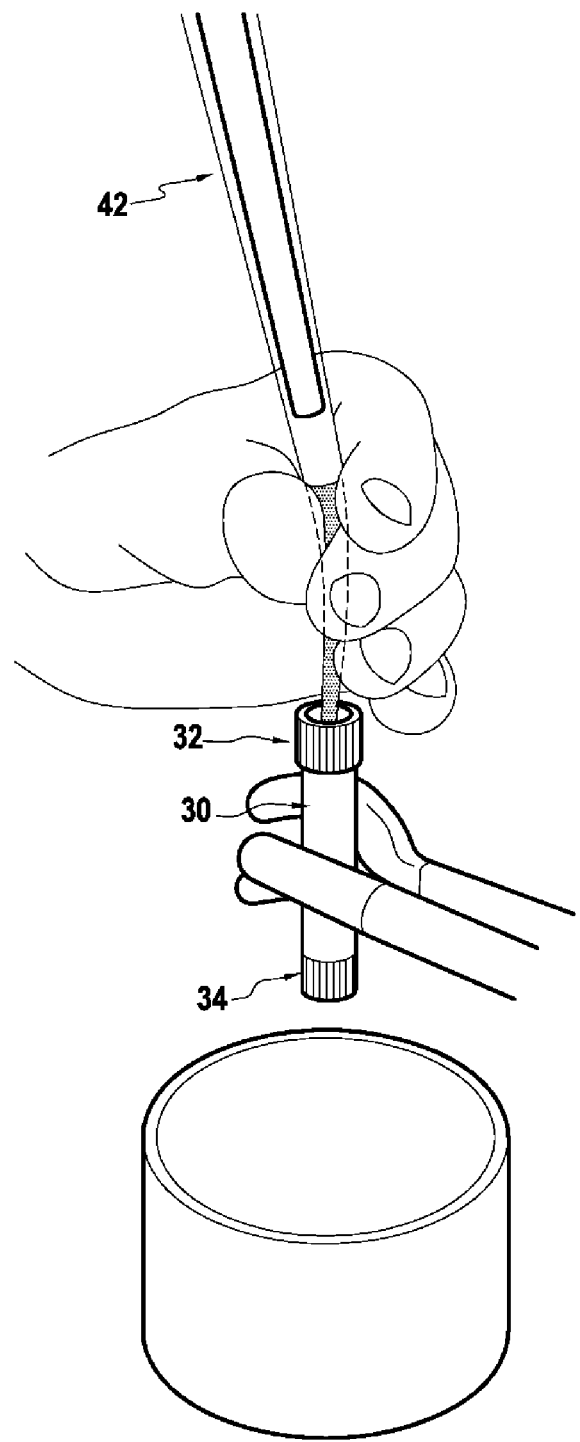
FIG. 6B schematically shows the injection of compressed air through the channel of the upper plug.

The support for injecting a treatment solution is a plastic tube 30 (see FIGS. 6A and 6B), with a diameter of around 10 mm and a height h of around 30 mm, comprising an upper plug 32 and a lower plug 34, each of said plugs 32, 34 comprising a channel passing through it and opening onto the interior volume of tube 30. Tube 30, comprising the lower plug 34, is filled with sand model 36 in one go and sand 36 is packed using upper plug 32. A volume of grout 38 equivalent to 10 porous volumes (10 times the porous volume of sand model 36), or approximately 10 ml, is injected using a syringe 40 through the channel of upper plug 32 (see FIG. 6A). This injection step may be repeated if necessary. Then, compressed air 42 is injected (flushing) for 1 minute through the channel of upper plug 32 so as to expel the water contained in the injected grout (see FIG. 6B). In this specific example, the maximum compressed air pressure is 2 bars. This step may be repeated if necessary. These steps of injecting geopolymer cement grout and compressed air, then the step of polymerizing the geopolymer, are carried out at ambient temperature (in particular of around 20° C.) and at atmospheric pressure for Examples 3 to 10 (EX3 to EX10), and Comparative Examples 11 to 13 (CEX11-CEX13). For Examples 1 and 2 (EX1-2), the polymerization step is accelerated by subjecting the sand models treated to a heat treatment aimed at accelerating setting in the laboratory and consisting of subjecting them to a temperature of 70° C. in an oven for 24 h (ambient pressure).

The treated sand samples are tested after the heat treatment in the case of Examples 1 and 2, and at the end of at least 10 days so that the consolidation is effective (i.e., that the geopolymer is polymerized) for a polymerization at ambient pressure and temperatures.

VIII—Preparation of Geopolymer Cement Grout

Different examples of geopolymer cement grout are prepared from the proportions described in the table shown in FIG. 8. The basic activator solution, comprising sodium silicate, sodium hydroxide and added water (not included in the sodium silicate solution), is prepared in advance so that it cools to ambient temperature. Then the solid particles, in particular metakaolin, are introduced into the basic solution, with stirring with a magnetic stirrer, for 30 minutes. The added water is demineralized. The grout obtained is ready to use.

IX—Injectability Into the Sand Model

1—Comparative Examples: CEX1, CEX2 and CEX3, and CEX11-13

The polyacrylamide (CEX1) and sodium silicate (CEX2, CEX3) solutions are injected with no difficulty into the filled tubes of the sand model.

In contrast, it is not possible to inject the geopolymer cement grout according to Comparative Examples 11 (CEX11) and 12 (CEX12). Reduction of the mass concentration of metakaolin does not improve injectability (since CEX11 is less concentrated in metakaolin than CEX12). The injectability of a geopolymer cement (CEX13) with a metakaolin (MK 1200S) comprising finer particles also does not improve injectability since injection is still impossible.

2—Wet Grinding

Figure 7:
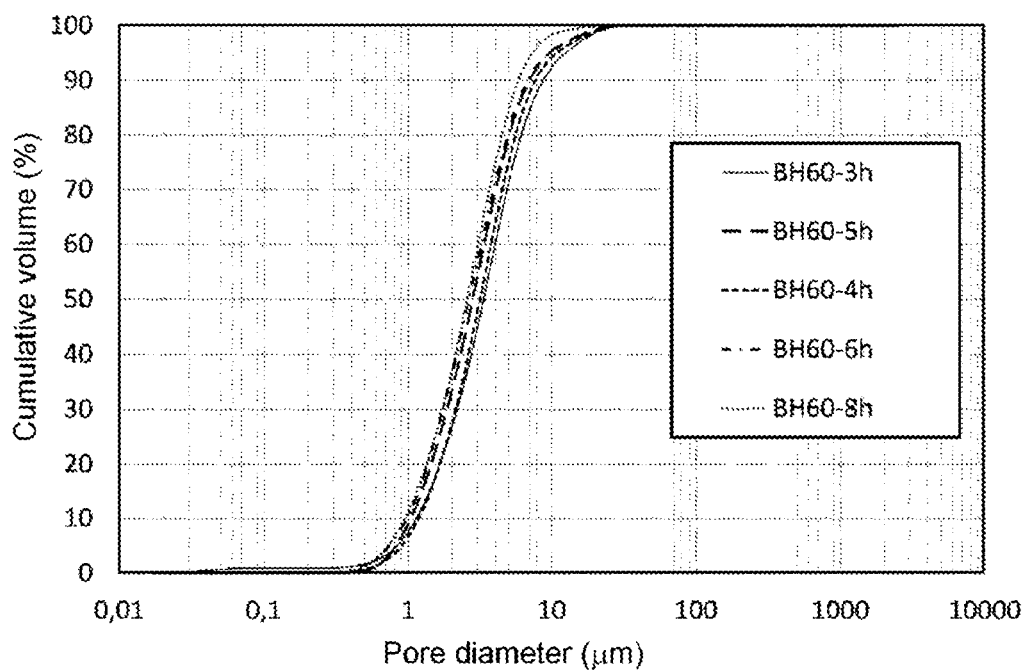
FIG. 7 shows the particle size distribution of metakaolin as a function of the cumulative volume of the pores % measured by laser granulometry; the various curves correspond to wet grinding times.
Figure 9:
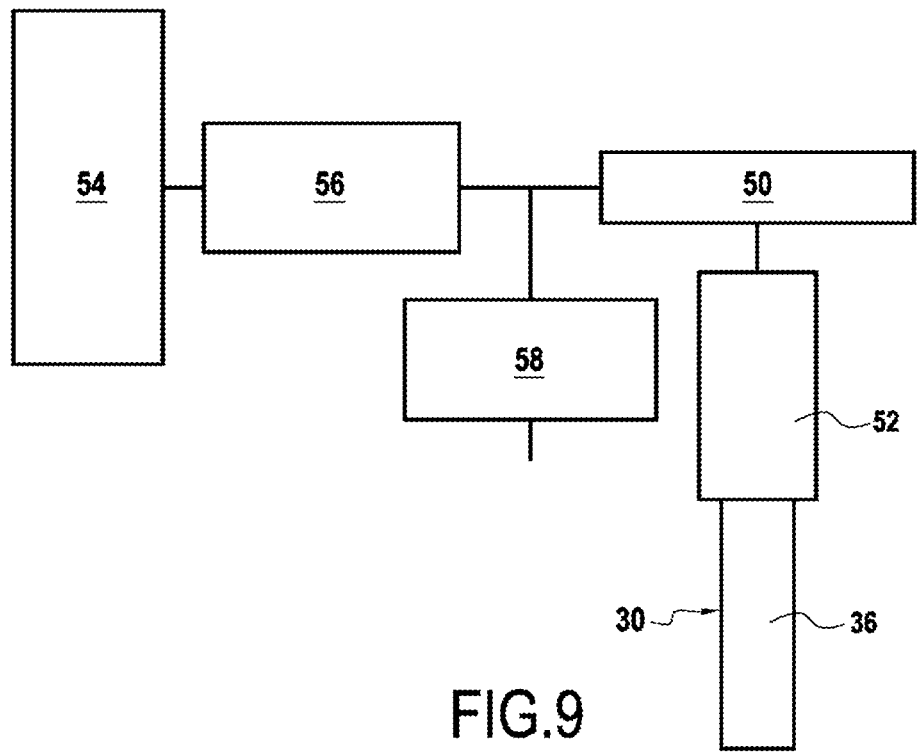
FIG. 9 schematically shows the protocol for measuring the gas permeability of the consolidated sand model.

The inventors then proceeded to wet grinding of metakaolin MK 1200S. A volume of 200 ml of demineralized water is mixed with 60 g of MK 1200S powder then the whole is ground using a planetary grinder, Pulverisette 7 (marketed by the Fritsch company); the balls have a diameter of around 0.5 mm. The grinding speed is around 100 revolutions per minute and the grinding time is variable (in Table 3 below comprised between 3 h and 8 h). The mixture is then recovered and dried in the oven at 105° C. for 24 h. The values indicted in Table 3 below result from FIG. 7.

TABLE 3

| Grinding | $d_{90}$ | $d_{50}$ | $d_{10}$ |
|---|---|---|---|
| BH60-3 h | 8.74 | 3.34 | 1.14 |
| BH60-4 h | 7.72 | 3.16 | 1.19 |
| BH60-5 h | 7.01 | 2.81 | 1.05 |
| BH60-6 h | 6.83 | 2.65 | 0.98 |
| BH60-8 h | 5.89 | 2.57 | 0.95 |

The geopolymer cement grouts according to Examples EX1 to EX10, including EX2A, for which the metakaolin has been ground, are all injectable into the sand model, regardless of the grinding time of 3 h, 4 h, 5 h, 6 h, 7 h or 8 h, for a mass of metakaolin relative to the mass of the geopolymer cement grout greater than or equal to 0% and less than or equal to 30%.

According to the porosity examined above for the siliceous sand model ($d_{50}$ comprised between 28 μm and 34 μm) and $d_{50}$ of metakaolin particles measured, the jamming ratio is comprised between 8.4 and 13.2.

3—Laser Granulometry Measurement Protocol

The reference for the measurement device is: Shimadzu SALD 2300, the software is WING SALD II. 0.1 g of sample powder to be tested is mixed in 50 ml of pure water, then the powder is dispersed for 3 min with ultrasound. The powder in suspension is arranged in the particle size analyser (batch cell), is filled with pure water; stirring of the batch cell is at maximum; dropwise addition of the powder obtained into the batch cell; the batch cell must be filled between the two lines after addition of the solution. For acquisition, the parameters for kaolinite in the software are used. Then, addition of the suspension into the batch cell is stopped when the luminous intensity is comprised between 20 and 60%. Adsorbence is thus comprised between 0 (and strictly greater than 0) and 0.2. Manual grinding is optionally done dry for 1 minute to deagglomerate the ground powder.

X—Evaluation of Permeability and Rupture Pressure (mbar) of Sand Models Treated by the Geopolymer Cement Grout According to the Invention, the Polyacrylamide Solution (CEX1) and the Basic Sodium Silicate Solution (CEX3)

1—Permeability Measurement Protocol (m²)

The sample to be tested, i.e., tube 30 comprising model sand 36 having undergone at least one treatment fluid injection, in this specific example a single injection, then at least one neutral treatment gas injection, in particular argon, in this specific example, a single gas injection, is in fluid connection with a pressure gauge 50 by means of a tight fitting 52. Upper plug 32 and lower plug 34 of tube 30 were removed beforehand.

A gas 54, in this specific example compressed air, is injected into the sample. The gas flow rate and gas pressure are regulated by means of a flow-rate controller device 56 and a pressure regulator 58 coupled to pressure gauge 50.

The permeability is measured according to the following Forchheimer formula:

$$\frac{(P_i^2 - P_0^2)}{LP_0} = \frac{\mu}{K} \times \frac{Q}{A} + \frac{10.44}{D} \rho \frac{Q^2}{A^2}$$

wherein $P_0$ is atmospheric pressure (Pa), $P_i$ is the upstream pressure (Pa), L is the height of the sample tested (m), $\mu$ is the dynamic viscosity (Pa·s), K is the permeability (m²), Q is the volume flow rate reduced to $P_0$ (m³·s⁻¹), A is the area of the cross section (m²), D is the mean pore diameter (m) and $\rho$ is the density of the fluid (kg·m⁻³).

In order to determine values D and K of the Forchheimer equation, a density $\rho$ of the injected fluid is used (argon: 1.7 kg/m³), then curve $(Pi^2-P_0^2)/LP_0$ is plotted according to flow rate Q, and the leading coefficients of the polynomial of degree 2 are recovered and interpolated in the sense of least squares by Excel. The intercept is set to zero and the interpolation is of the form a x+b x². From coefficients a and b calculated in the sense of least squares, K and D are calculated as: $K=\mu/(a*A)$ and $D=10.44*\rho/(b*A^2)$.

2—Mass Percent of Metakaolin in the Geopolymer Cement Grout Versus Rupture Pressure For the measurement of the rupture pressure, upper 32 plug and lower plug 34 of tube 30 have been removed beforehand, then argon is injected at increasing pressure at the lower portion of tube 30 (corresponding to the one receiving lower plug 34). The pressure value from which the consolidated sand breaks and disintegrates until it comes completely out of the tube is noted.

Figure 10:
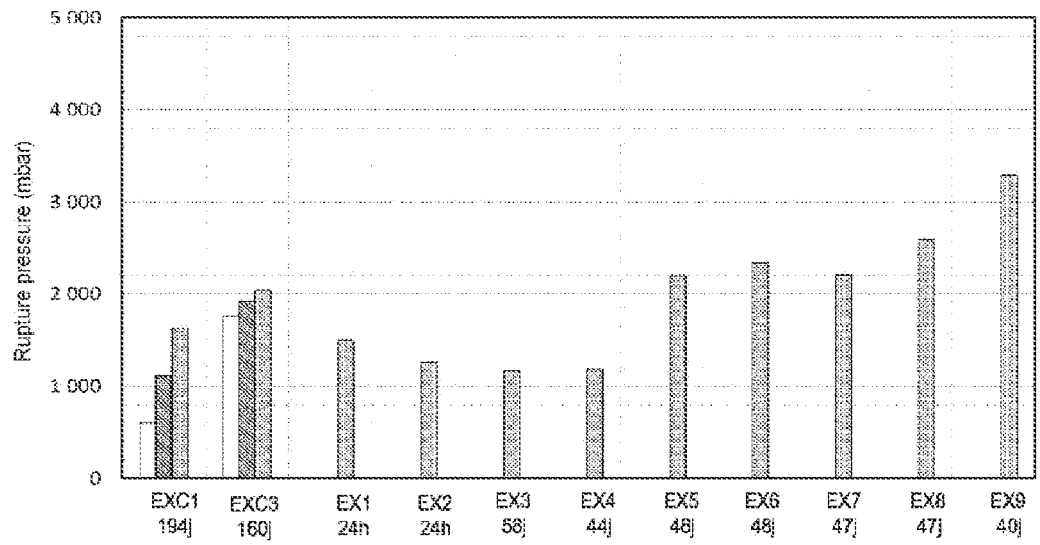
FIG. 10 shows the mean, minimum and maximum rupture pressures (mbars) measured for the Comparative Examples (CEX1, CEX3) and the mean rupture pressures (mbars) measured for Examples 1 to 9 according to the invention.

The geopolymer cement grouts according to Examples EX1 to EX9 were injected into the sand model, then compressed air is injected to expel the water, such as described in Section VII. The breaking pressures (see FIG. 10) are therefore measured in the consolidated sand models. FIG. 10 also shows on the x-axis the number of days or hours after the last gas injection performed at the end of which the rupture pressure was measured. The rupture pressures measured in FIG. 10 for Examples 1 to 9 (EX1-9) were obtained for geopolymer cement grouts for which the metakaolin has undergone wet grinding for 8 h. It was noted that from 7% by mass of metakaolin in the grout the rupture pressure (mbar) is increased by 2 relative to PAM (CEX1), and 3 for 25% by weight of metakaolin in the grout.

Figure 11:
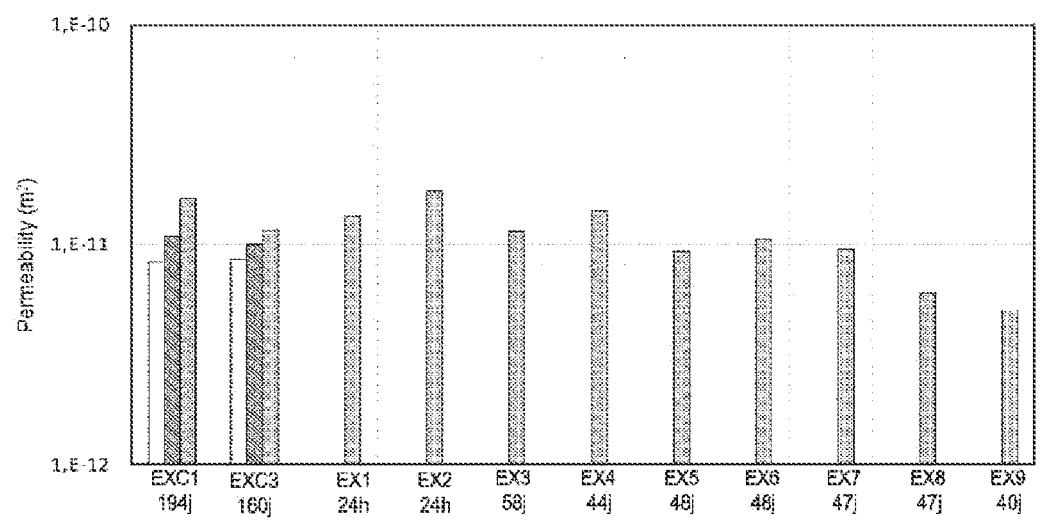
FIG. 11 shows the mean, minimum and maximum permeabilities ($m^2$) measured for the Comparative Examples (CEX1, CEX3) and the mean permeabilities ($m^2$) measured for Examples 1 to 9 according to the invention.

3—Mass Percent of Metakaolin in the Geopolymer Cement Grout Versus Permeability kgas (m²) (FIG. 11)

The gas permeabilities (argon) are measured in the initial state at low pressure gradient (100 to 500 mbars) on consolidate sand (such as described in Section VII). FIG. 11 also shows on the x-axis (EX3-EX9) the number of days after the last gas injection performed at the end of which the rupture pressure was measured. Permeability was measured for the geopolymer cement grouts (EX1-9) whose metakaolin has undergone wet grinding for 8 h.

In the first approach, the consolidated sand model permeability tested with the basic solution (CEX3) is considered to be equivalent to the permeability of the model sand before consolidation. It is noted that up to 15% of metakaolin by mass, the permeability of the sand model tested and consolidated is of the same order of magnitude as that of CEX3.

The permeability of Examples 8 and 9 could be improved, especially by increasing the size of metakaolin particles further, especially the $d_{50}$ of the metakaolin particles.

4—Mass Percent of Metakaolin in the Geopolymer Cement Grout Versus Rupture Pressure The sole differences with Examples 5 to 8 tested at point X.3. above are that:
- the treated sand models undergo a heat treatment aimed at accelerating setting in the laboratory and consisting of subjecting them to a temperature of 70° C. in an oven for 24 hours (ambient pressure), then allowing them to stand at ambient pressure and temperature (20° C.) for 6 days;
- the wet grinding of metakaolin is 6 hours;
- the pressure measurements are first done on consolidated sand, then on the same consolidated sand that has also undergone an injection of fresh water.

Figure 12:
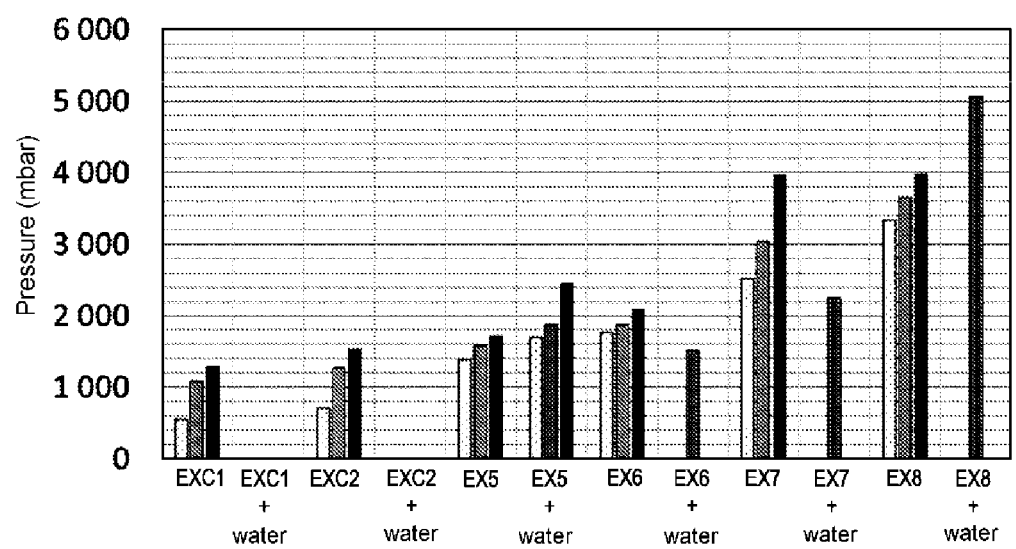
FIG. 12 shows the mean, and optionally, minimum and maximum, rupture pressures (mbars) measured for the Comparative Examples (CEX1, CEX2) and Examples 5 to 8 according to the invention on blank consolidated sand models and then on consolidated sand models onto which fresh water was injected.

It is observed in FIG. 12 that the consolidations with PAM (CEX1) and the basic sodium silicate solution (CEX3) are poor, since the sand samples are destroyed following the injection of fresh water (leakage of the sand by the lower part of the tube and zero measured rupture pressure).

It is also observed that the geopolymer cement grout according to the invention (EX5-8) conserves an equivalent rupture pressure before and after freshwater injection. Then, from 15% of metakaolin by mass in the grout (EX7), the rupture pressure is tripled compared to Comparative Examples CEX1 and CEX3.

XI—Viscosity Measurements

TABLE 4

| Examples | σ max (Pa) | Pre-shearing of 1 sec (Pa) | µ measured (mPa.s) |
|---|---|---|---|
| CEX1 | 1 | 0 | 12.8 |
| CEX3 | 1 | 0 | 2 |
| EX10 | 5 | 25 | 45.5 |
| EX9 | 5 | 20 | 5.8 |
| EX7 | 5 | 20 | 5.9 |

Viscosity measurement protocol: the measuring device is a Kinexus rheometer, Malvern brand, with a cone-plane geometry. For each test, the maximum climb stress σ and the duration of ascent and descent, and a pre-shear (20 Pa or 25 Pa) are fixed if necessary. The viscosity is determined by calculating the slope of the linear part of the ascent curve (the curve corresponds to the shear stresses (Pa) measured on the y-axis as a function of the shear rate (s$^{-1}$) on the x-axis). The most easily injectable geopolymer cement grouts are those with a viscosity close to water, i.e., those of Examples 7 and 5.

The invention claimed is:

1. A method of treatment of a geological reservoir for the storage of a first fluid in a rock formation against sand infiltration during production of the first fluid from said geological reservoir via a well drilled through said rock formation, the method comprising:
    at least one step of injecting a geopolymer cement grout into said rock formation, said geopolymer cement grout comprising a mass fraction of water, relative to its total mass, greater than or equal to 50%, and after,
    at least one first step of injecting a first gas around edges of said well and/or through said well to reconnect the first fluid produced from the geological reservoir to said well, and to expel the water contained in the geopolymer cement grout, and after,
    at least a drying phase comprising a second gas injection or the continuation of the first gas injection,
    wherein the rock formation has a porosity higher than or equal to 15%; and
    wherein said geopolymer cement grout comprises at least one aluminosilicate component, or a mixture of several components that is a source of aluminosilicate, and
    wherein at least 50% by cumulative volume of particles, of said at least one aluminosilicate component, or of said mixture of several components that is a source of aluminosilicate, (i) have a particle size that is less than or equal to one-sixth the size of at least 50% by cumulative volume of the pores of the rock formation or (ii) have a particle size that is less than or equal to one-sixth the mean hydraulic diameter dh of the pores of the rock formation.

2. The method according to claim 1, comprising performing several injection cycles, wherein each injection cycle comprises injecting the geopolymer cement grout followed by injecting the first gas.

3. The method according to claim 1, wherein the rock formation comprises pores having walls, and wherein said method comprises polymerizing the geopolymer cement grout to form a geopolymer cement coating that at least partially covers the walls of the pores of the rock formation.

4. The method according to claim 1, wherein prior to said injecting of the geopolymer cement grout, the rock formation is permeable and contains the first fluid, and wherein the rock formation remains permeable and contains a second fluid, after said drying phase.

5. The method according to claim 1, wherein the geopolymer cement grout comprises:
    a) at least one aluminosilicate component, or a mixture of several components that is a source of aluminosilicate, and
    b) an alkaline silicate solution.

6. The method according to claim 5, wherein the size of at least 50% by cumulative volume of the particles of the aluminosilicate component or of the mixture of several components that is a source of aluminosilicate is less than or equal to 5 µm.

7. The method according to claim 5, further comprising:
    preparing the particles of said at least one aluminosilicate component or said mixture of several components that is a source of aluminosilicate, so that at least 50% of the cumulative volume of said particles (i) have a particle size that is less than or equal to one-sixth the size of at least 50% by cumulative volume of the pores of the rock formation or (ii) have a particle size that is less than or equal to one-sixth the mean hydraulic diameter dh of the pores of the rock formation.

8. The method according to claim 7, wherein said preparing comprises grinding.

9. The method according to claim 5, further comprising reducing the particle size of said at least one aluminosilicate component or said mixture of several components that is a source of aluminosilicate.

10. The method according to claim 5, wherein said at least one aluminosilicate component or said mixture of several components that is a source of aluminosilicate is selected from the group consisting of: a metakaolin, a kaolin, a bentonite, fly ash, blast furnace slag, silica smoke, and mixtures thereof.

11. The method according to claim 5, wherein the alkaline silicate solution includes a potassium, sodium or calcium alkaline silicate solution.

12. The method according to claim 5, wherein the geopolymer cement grout comprises a mass fraction of said at least one aluminosilicate component or of the mixture of several components that is a source of aluminosilicate relative to its total mass, that is greater than 0% and less than or equal to 30%.

13. The method according to claim 5, wherein the chemical composition resulting from the mixture of said at least one aluminosilicate component or mixture of several components that is a source of aluminosilicate with the alkaline silicate solution, has the formula: $Al_2O_3$; $nSiO_2$; $r(M^1_2O$ or $M_2O)$; $zH_2O$, wherein $2 \leq n \leq 500$ and $z \geq 25$, $1 \leq r \leq 500$, and $M^1$ is Na or K and $M^2$ is Ca.

* * * * *